United States Patent [19]

Liebel

[11] Patent Number: 4,467,004
[45] Date of Patent: Aug. 21, 1984

[54] SLIP SHEET

[75] Inventor: Henry L. Liebel, Cincinnati, Ohio

[73] Assignee: Angleboard Inc., Cincinnati, Ohio

[21] Appl. No.: 395,717

[22] Filed: Jul. 6, 1982

[51] Int. Cl.[3] .......................... B32B 3/02; B32B 29/00
[52] U.S. Cl. ..................................... 428/81; 108/51.3;
248/346; 428/154; 428/191; 428/192; 428/332
[58] Field of Search .................. 428/154, 81, 182, 191,
428/192, 332; 108/51.3, 51.1; 248/346; 206/386

[56] References Cited

U.S. PATENT DOCUMENTS

| D. 237,468 | 11/1975 | Andrews et al. | D9/99 |
|---|---|---|---|
| 2,832,487 | 4/1958 | Oster et al. | 214/514 |
| 2,913,206 | 11/1959 | Paris | 248/120 |
| 3,112,715 | 12/1963 | Callahan et al. | 103/52 |
| 3,430,585 | 3/1969 | Grant et al. | 108/51 |
| 3,763,792 | 10/1973 | Webb | 108/51 |
| 3,776,145 | 12/1973 | Anderson et al. | 108/51 |
| 3,790,010 | 2/1974 | Stirling et al. | 214/152 |
| 3,863,784 | 2/1975 | Webb | 214/10.5 R |
| 3,913,764 | 10/1975 | Stirling et al. | 214/621 |
| 4,022,135 | 5/1977 | Bauman, Jr. et al. | 108/51.3 |
| 4,065,014 | 12/1977 | Sagmiller | 214/621 |
| 4,159,887 | 7/1979 | Dick | 414/786 |
| 4,198,912 | 4/1980 | Gramckow | 108/51.1 |
| 4,284,259 | 8/1981 | McCaskill | 428/186 |

FOREIGN PATENT DOCUMENTS 2802330 7/1978 Fed. Rep. of Germany .

OTHER PUBLICATIONS

Material Handling Engineering, "Unit Handling: How to Mix Attachments, Slip Sheets and Stretch Wrap," pp. 72-75.
Paperboard Packaging, "Slip Sheet System vs. Wood Pallet," Sep. 1980, p. 117.
Mead Paperboard Products Brochure, "A Guide to Replacing Expensive Wood Pallets," Copyright 1980.
Paperboard Packaging, "Put it on a Slipsheet!" pp. 92-96.

Primary Examiner—Paul J. Thibodeau
Attorney, Agent, or Firm—Wood, Herron & Evans

[57] ABSTRACT

A slip sheet for receiving, handling, storing and shipping a unitized load of product is disclosed. The slip sheet includes lips preferably on two adjacent sides allowing it to be gripped and pulled onto a fork truck with the aid of a conventional push-pull attachment. The slip sheet includes a first or bottom sheet of paperboard having lip extensions, a pair of intermediate sheets of paperboard laminated to opposite ends of the bottom sheet and overlying the ends of the lip extension along a first side and the length of the lip extension on a second side, and a pair of top sheets of paperboard laminated to the bottom sheet and to the ends of the intermediate sheets and overlying the ends of the lip extension on the second side and the length of the lip extension on the first side. The slip sheet is thus made up of a single-layer paperboard center section, a three-layer paperboard laminate at the corners of the slip sheet adjacent the lip ends, and a two-layer paperboard laminate at the center sections of the lips and the sides of the slip sheet adjacent these center sections. The machine direction of the intermediate and top sheets are perpendicular to each other. The slip sheet of the present invention provides for a substantial decrease in the cost of materials over prior art systems without sacrificing performance.

7 Claims, 4 Drawing Figures

U.S. Patent  Aug. 21, 1984  4,467,004
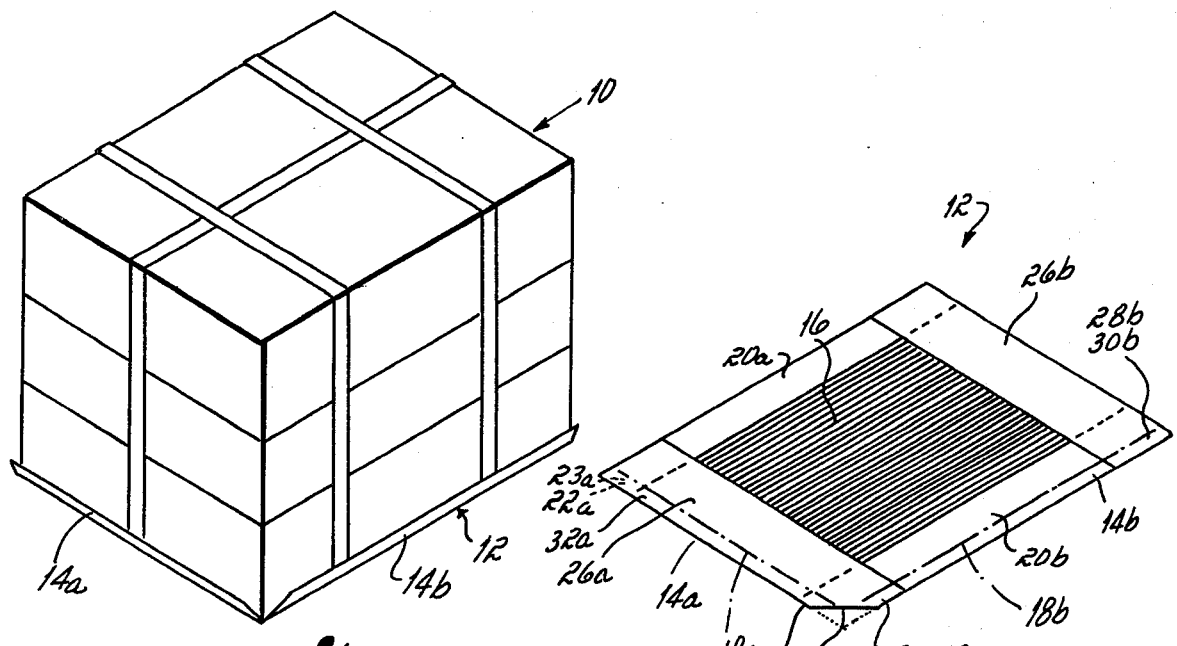
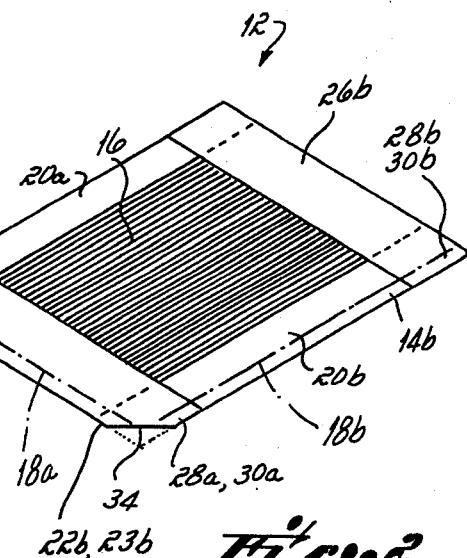
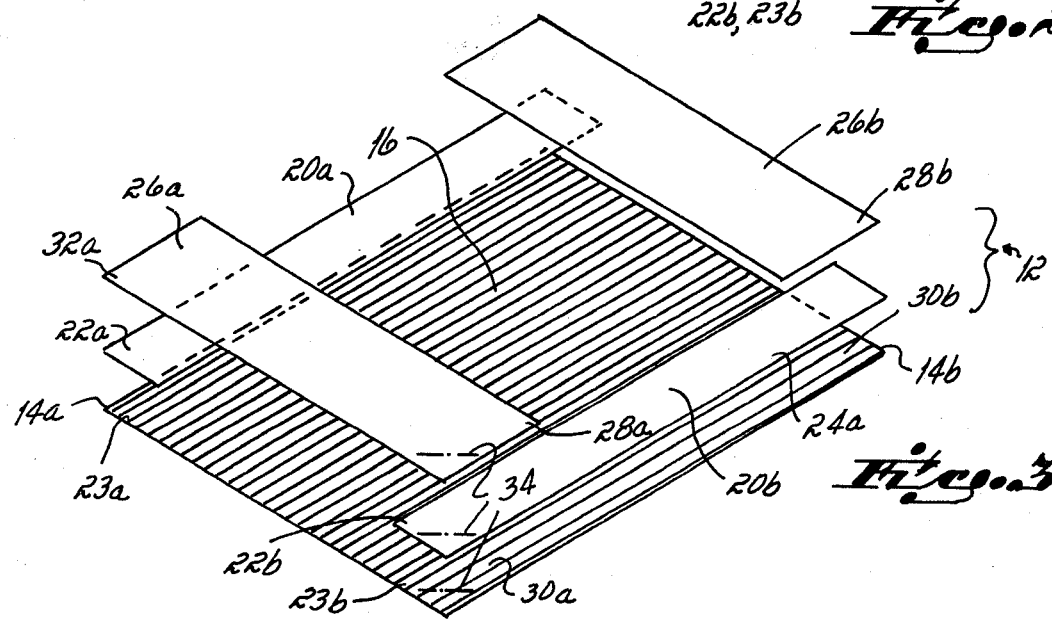
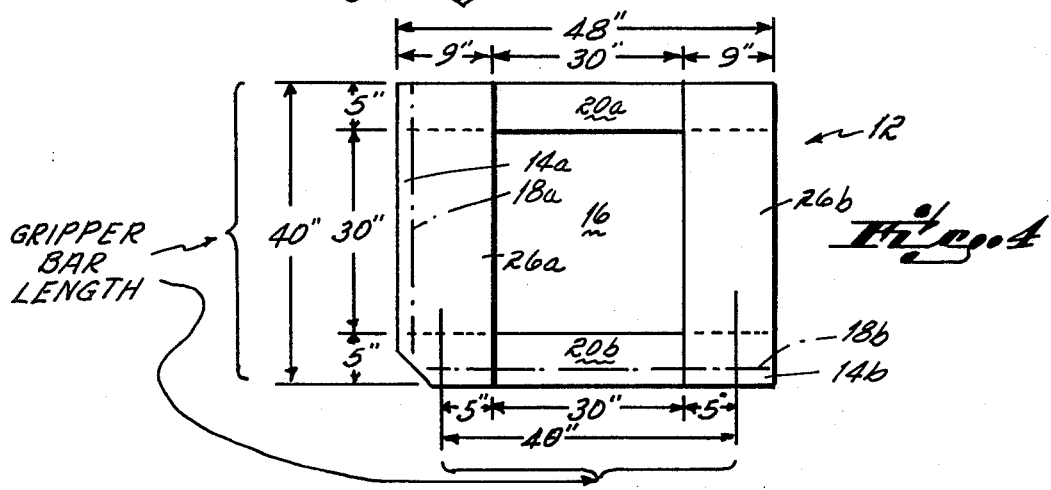

SLIP SHEET

BACKGROUND OF THE INVENTION

This invention relates to slip sheets for receiving, handling, storing and shipping a unitized load of product, and, more particularly, to an improved laminated paperboard slip sheet.

In many applications, product, e.g., cartoned or bagged product, is unitized to achieved economies by receiving, shipping, handling and storing the product in bulk loads. For many years, these unitized loads have been carried on conventional hardwood pallets. The wooden pallet system for handling unitized loads was adopted as the most popular system initially because the wood pallet was low in cost, availability of wood was adequate, and it was easy to handle the product on the wooden pallet with a standard and relatively low cost forklift truck. However, the use of wooden pallets has suffered from a number of disadvantages including high initial investment costs, problems in inventoring, storing, and returning the pallets; high handling and transportation costs in shipping pallets in two directions; the fact that wooden pallets consume a high percentage of available hardwood; high cost of pallet maintenance to keep the pallets in service and high cost of pallet replacement; problems of lost pallets; and high weight and volume which adds significant costs to shipment and space requirements for storage of the pallets. Wooden pallets can also cause damage to the load during handling and storage, for example, by nails and broken boards rupturing packages mounted on the pallets and product overhang and load settling into broken areas deforming the load. Further, damage can also result to the top of the load when another wooden pallet is placed on top of it.

Because of these and a number of other disadvantages of wooden pallets, the slip sheet method of handling unitized loads was adopted in the mid-1950's, and its use has continued to expand up to today. A slip sheet is a thin sheet of material, typically a solid fiber, which is of a length and width generally the size of the unit load. The slip sheet has one or more "lips" or "pull tabs" which extend about three to four inches beyond the load allowing the slip sheet to be gripped and pulled onto the platens of a fork truck with the aid of a gripper or push-pull attachment mounted to the fork truck. Typically, the slip sheets are provided with lips or pull tabs on two adjacent sides allowing the load to be picked up either from the front or the side for convenience of loading and full utilization of trailer width, although they can be made with up to four lips or tabs.

Solid fiber is the most commonly used material for slip sheets. Fiber slip sheets have been constructed by laminating three or more sheets of kraft paper together with a waterproof adhesive. The thickness of the sheets typically varies from 0.036 to 0.090 inch. This is typically accomplished by varying the thickness of the individual kraft sheets which make up the lamination. Heavier gauge fiber slip sheets are also available.

The use of slip sheets has contributed significant economies over the use of wooden pallets. Their cost is approximately 1/10th that of a hardwood pallet; and, since they are expendable, they do not require any maintenance, inventory or return. They can be thrown away at the end of the first trip or, if desired, reused until worn out. Moreover, the loss of slip sheets is not a problem. Because they take up essentially no room, slip sheets allow more space in the trailer for the product being shipped. Moreover, since you are shipping relatively lightweight paper instead of heavy hardwood, the weight reduction achieved by using slip sheets instead of wooden pallets creates about a twenty-fold savings of freight weight. Still further, the same number of slip sheets can be stored in about 20% of the space required for wood.

SUMMARY OF THE INVENTION

Although the use of fiber slip sheets has significantly reduced the costs of handling unitized loads, it has been discovered that further economies can still be achieved. That is, as stated above, slip sheets are typically produced by laminating sheets of paperboard to a thickness range of 0.036 to 0.090 inch. The cost of such slip sheets is typically on the order of $0.70 to $ 0.80 each in bulk quantities. It is among the principal objectives of the present invention, however, to significantly reduce the cost of the slip sheets while maintaining their strength, durability and ability to handle unitized loads insuring good utilization of available trailer space.

To this end and in accordance with a presently preferred embodiment of the invention, the slip sheet includes a laminate of five sheets of paperboard joined together, for example, by a waterproof adhesive. The first or bottom sheet is the length and width of the unit load and includes lip extensions on two adjacent sides making it possible for the load to be picked up from either the lengthwise or the widthwise direction, i.e., from the front or the side. A second or intermediate pair of sheets of paperboard are laminated to opposite ends of the first sheet. These intermediate sheets of paperboard are of a width substantially less than the width and length of the first or bottom sheet. They are laminated to the bottom sheet such that their machine direction extends in a direction parallel to the machine direction of the first sheet. One end of each intermediate sheet extends across and overlies opposite ends of the lip extension on one of the sides, and a longitudinal edge section of one of the intermediate sheets extends along and overlies the length of the lip on the other side. A third or top pair of paperboard sheets are laminated to the bottom sheet and to the ends of the pair of intermediate sheets with their machine direction being perpendicular to the machine direction of the intermediate sheets. Ends of the top pair of sheets thus extend and overlie opposite ends of the lip extension along which the intermediate sheet runs, and one longitudinal side portion of the top pair overlies the length of the lip extension of the bottom sheet on the other side as well as the ends of each intermediate sheet overlying the lip extension.

With this arrangement of paperboard layers, the slip sheet includes a single-layer paperboard center section, a three-layer laminate at its corners adjacent the lips, and a two-layer laminate at the center sections of the lips between the three-layer laminate corners and at the edges of the sheet adjacent these center sections. Thus, the ends of the lips, which have been found to be subjected to the highest tensile stress during handling, include three laminated layers and have significant strength. Score lines are provided to permit the lips to be bent upwardly such that they may be grasped by the gripper or push-pull mechanism of a forklift truck.

In accordance with the present invention, there is created in effect a peripheral frame to the base sheet of a two-layer laminate with a three-layer laminate being present at the corners adjacent the lips. As stated, it has been found that the greatest tensile stress on the lips during gripping and movement of the load is on the end portions of the lips. The three-layer laminate at the corners adjacent the lips thus provides relatively high tensile strength to withstand repeated movements of load. However, it may be appreciated that where such tensile strength is not needed, for example, in the center section which is framed by the laminated peripheral portions, only a single thickness of sheet material is present. The present invention thus provides significant economies in the manufacture of slip sheets in that a material savings of almost 50% can be realized without sacrifice in performance. A prime objective in the material handling art is reduction in cost. Indeed, it has been determined that the slip sheet manufactured according to the present invention costs approximately one-half of those slip sheets now available resulting in a even greater savings over wooden pallet handling systems.

Other objectives and advantages of the present invention will become apparent from the following detailed description of the invention, reference being had to the accompanying drawings.

BRIEF DESCRIPTION OF THE DRAWINGS

FIG. 1 is a perspective view illustrating the environment in which the slip sheet is used.

FIG. 2 is a perspective of the slip sheet of the present invention.

FIG. 3 is an exploded perspective view illustrating the assembly of the slip sheet of the present invention.

FIG. 4 is a plan view showing presently preferred dimensions of the slip sheet.

DETAILED DESCRIPTION OF THE INVENTION

Referring now to FIG. 1, in the slip sheet method of handling unitized loads, a load 10 which is unitized, for example, by taping, tying, gluing, cartoning, or stretch wrapping, has a defined unit width and length. Typical sizes are roughly 48 inches long by 40 inches wide. A slip sheet 12 is generally a two-dimensional sheet upon which the load rests. The slip sheet typically has one or two lips or pull tabs 14a and 14b which allow the load to be picked up from more than one side. Although slip sheets can be made with up to four lips, they are typically provided with lips on two adjacent sides making it possible to pick up the load from either the lengthwise or widthwise direction of the load, i.e., from the front or side. This insures good utilization of trailer width.

In use, a load is moved by use of a conventional forklift truck wherein the standard forks are replaced with wider tapered forks which serve as platens for supporting the load on the slip sheet from below. These platens are similar to conventional forks, but wider, and serve to support the load while it is being handled by the truck. The truck further includes an attachment designed to grab the lip 14a or 14b of the slip sheet and pull the load onto the platens of the truck. In use, an operator lines up the platens of the truck with the load. The platens which are raised about 3 inches above the floor are attached to a mast which is tilted forward until the tips of the platens touch the floor. The operator then drives the truck forward until the platen tips are underneath the slip sheet. A pusher plate carrying a gripper mechanism is extended so that the slip sheet lip 14a or 14b fits into a channel opening in the gripper. The pusher plate is then retracted. On retraction of the pusher plate, the gripper automatically clamps the slip sheet lip. The operator then moves forward slowly as the load is being pulled onto the platens. As the weight of the load is transferred to the platens, the mast is slowly tilted to a vertical position thus scooping up the load. To transfer the load, the mast is tilted back to raise the load 3 or 4 inches above the floor for movement of the truck. To remove the load from the truck, the same steps are followed only in reverse.

Referring now to FIG. 2, the slip sheet 12 comprises a first or bottom sheet 16 formed of paperboard. As used herein, the term "paperboard" refers to either virgin or recycled kraft sheets which may, if desired, be coated with a moisture vapor barrier. Generally, the sheets are not corrugated but they could be if so desired. The bottom sheet 16 is of a width and length corresponding to the size of a standard unit load, for example, 40 inches by 48 inches, and includes the lip extensions 14a and 14b on two adjacent sides. The lip extensions 14a and 14b are defined by score lines 18a and 18b, respectively (shown in dash) which are placed in the laminated article in the latter stages of manufacture. The lips extend outwardly about 2 to 4 inches from the score lines. These score lines permit the lips 14a and 14b to be bent upwardly so that they may be grasped by the gripper mechanism of the truck.

The machine direction of the bottom layer 16 extends, in the embodiment shown in FIGS. 2 and 3, in the lengthwise direction of the sheet as indicated by the spaced series of parallel lines. As is known in the art, fiber sheets have significantly more tensile strength in the machine direction than in the cross-machine direction.

At opposite ends of the sheet 16, a pair of second or intermediate sheets of paperboard 20a and 20b are laminated to the first or bottom sheet 16. The sheets 20a and 20b are of a width significantly less than the width of the bottom sheet 16 and are of a length such that they extend the full length of the bottom sheet 16. Thus, their respective ends 22a and 22b extend across and overlie end portions 23a and 23b, respectively, of the lip extension 14a of the bottom sheet 16. In addition, an edge portion 24a of sheet 20b corresponding in width to the width of the lip extension 14b lies along the length of the lengthwise lip extension 14b. The intermediate sheets may be laminated to the bottom sheet by means of a suitable adhesive, for example, a waterproof adhesive, examples of which are available to the art.

The machine direction of sheets 20a and 20b extends in the same direction as the the machine direction of sheet 16, which is indicated by the series of spaced parallel lines shown in FIGS. 2 and 3.

A pair of third or top sheets of paperboard 26a and 26b are in turn laminated to the bottom sheet 16 and to the ends 22a and 22b of the second or intermediate sheets 20a and 20b, as well as to the opposite ends thereof. The top sheets 26a and 26b are of a width significantly less than the length of the bottom sheet 16 and have their long direction lying perpendicular to the long direction of the intermediate sheets. That is, the machine direction of the top sheets 26a and 26b is perpendicular to the machine direction of the bottom sheet 16 and the top sheets 26a and 26b are oriented such that their machine direction is perpendicular to the machine direction of the intermediate sheets. The ends 28a and 28b of the top sheets 26a and 26b, respectively, extend across and overlie end portions 30a and 30b, respectively, of the lip extension 14b. Moreover, a longitudinal edge 32a of top sheet 26a and extends along the lip extension 14a in the bottom sheet as well as across the ends of sections 22a and 22b overlying 23a and 23b. Again, a suitable waterproof adhesive may be used to laminate the top sheets to the intermediate and bottom sheets.

By virtue of the construction described above in relation to FIGS. 2 and 3, it may be seen that at the four corners of the slip sheet 12 a triple-layer laminate is provided which extends and includes the end sections 30a and 30b of the lip 14b in the lengthwise direction and end sections 23a and 23b of lip 14a in the widthwise direction. The side sections of the slip sheet lying between the four three-layer laminated corners, which include the center sections of the lips 14a and 14b, are made up of a two-layer laminate construction. Moreover, it will be seen that the lip 14a includes at its ends 23a and 23b two layers (bottom sheet 16 and intermediate sheets 20a and 20b) having their fibers oriented in the machine direction; and, on the other side, lip 14b includes at its ends 30a and 30b one layer (top sheets 26a and 26b) having their fibers oriented in the machine direction. The significance of this fact is that, in operation, the gripper bar of the forklift truck extends along the length of the lips 14a and 14b and pulls the slip sheet in the direction generally perpendicular to the length of the lips 14a and 14b, respectively. This subjects the ends 23a and 23b of the lips 14a and the ends 30a and 30b of the lips 14b to the greatest tensile load in this direction. Since the fiber sheets have significantly greater tensile strength in the machine direction than in the cross-machine direction, in the slip sheet of the present invention, the ends of the lips which are subjected to the greatest tensile load always comprise at least one sheet having its machine or strong direction in the direction of the tensile load. At no time is a lip subjected to stress solely in a cross-machine direction.

Referring again to FIG. 2, after lamination of the layers making up the slip sheet 12, the corner where the lips 14a and 14b intersect may be cut along a diagonal line 34 (shown as dotted in FIG. 3) to permit the lips to be bent upwardly along the score lines 18a and 18b. In the manufacturing process, the score lines can be placed in the slip sheet 12 after completion of the laminating operation.

The particular widths of the pair of intermediate sheets 20a and 20b and top sheets 26b and 26b are not critical to the invention although it will be recognized by those skilled in the art that the economies sought by the present invention may be realized either through a reduction in material costs due to a decrease in the width of the sheet or by buying relatively low price, e.g., scrap material of an available width eliminating the need for any cutting thereof. In general, the widths of each of the pairs of sheets 20a and 20b and 26a and 26b are less than one-half the width and length of the bottom sheet 16, respectively, and, preferably, about 12% to 25% of the width or length of the bottom sheet. More specifically, it has been found desirable to provide at least about a 5 inch length of the triple-layer laminate at the ends of the lips to be grasped by the gripper bar. Currently, a typical gripper bar width is 40 inches. Thus, looking at a typical slip sheet of a size 48 inches long by 40 inches wide, as shown in FIG. 4, it may be seen that by providing 5 inch wide intermediate sheets 20a and 20b there is defined in the widthwise direction a 30 inch wire two-layer laminate center section with 5 inch three-layer laminate ends 23a and 23b for gripping by the gripper mechanism for a total width in the widthwise direction of 40 inches. Looking at the lengthwise direction, the requisite 5 inches of three-layer laminate gripping length may be achieved by having the top sheets 26a and 26b 9 inches in width thus providing a 30 inch two-layer laminate center section and 5 inch three-layer laminates lying outboard thereof at the ends 30a and 30b for gripping by the gripping mechanism. If a 54 inch long sheet were desired, then the top sheets 26a and 26b would be 14 inches in width and so on.

The thickness of the slip sheet also is not critical. A suitable product has been made by laminating paperboard sheets 0.020 inch thick. Thus, the three-layer laminate corners are 0.060 inch in thickness while the sections intermediate thereto are 0.040 inch thick. However, those skilled in the art will recognize that any of the components of the slip sheet can be any practicable thickness whether plain or laminated. Moreover, it will be appreciated that any of the sheets 16, 20a and 20b, and 26a and 26b could itself be made of multiple plies to make it a desired thickness prior to laminating with the other sheets as described above in forming the slip sheet 12.

Moreover, it is possible to provide a slip sheet with only one lip in either the widthwise or lengthwise direction, if desired, merely by eliminating one of the pair of intermediate or top sheets. For example, referring to FIG. 3, if it were desired to eliminate the lip 14a in the widthwise direction, this would be accomplished merely by eliminating sheets 20a. Conversely, if it were desired to eliminate the lip 14b, it would merely be necessary to eliminate sheet 26b. Moreover, it will be appreciated that sheets 20a and 20b could be interchanged with sheets 26a and 26b such that 20a and 20b would form the top layer and 26a and 26b the intermediate layer.

The advantages of the present invention may be more fully appreciated by realizing that the slip sheet of the present invention as shown, for example, in FIG. 4, comprises a 46% reduction in the amount of paperboard that would otherwise be used if a conventional three-layer laminate were made. Thus, where a 0.065 inch fiber slip sheet, for example, would weigh about 3½ pounds the slip sheet of the present invention having the same thickness would weigh less than 2 pounds. Thus, in an order quantity of 5,000 units, the slip sheet of the present invention weighs over 8,000 pounds less than conventional slips sheets. Thus, not only does the present invention lend economies in terms of reduced material requirements, economies in shipping costs are also achieved. Moreover, as stated above the lips always have at least one sheet at the ends thereof whose machine direction extends in the direction of greatest tensile stress during use.

Thus, having described the invention, what is claimed is:

1. A slip sheet for handling, storing, shipping, and receiving a unitized load of product having a lip adapted to be received in a grasping mechanism for moving the load, comprising:
   a first sheet of paperboard having a lip extension along one of its edges, said lip extension having a width and a length,
   a pair of second sheets of paperboard laminated to opposed marginal side portions of said first sheet and extending therealong and overlying opposed end portions of said lip extension, each of said second sheets having a width less than the length of said lip extension, a third sheet of paperboard laminated to said first sheet and to an end portion of each of said second sheets, said third sheet having a longitudinal edge portion overlying the length of said lip extension of said first sheet, the width of said third sheet being less than the linear dimension of said first sheet in the widthwise direction of said lip extension, but greater than the width of said lip extension, each said sheet having a machine direction whereby said lip extension comprises a two-layer laminated center portion and three-layer laminated end portions, one layer of said end portions having its machine direction perpendicular to the machine direction of the other two layers.

2. The slip sheet of claim 1 wherein at least about 5 inch long ends of said lip are present for receipt in said grasping mechanism.

3. The slip sheet of claim 1 wherein each said layer of paperboard has a thickness in the range of about 0.020 to 0.030 inch.

4. A slip sheet for handling, storing, shipping, and receiving a unitized load of product having a lip adapted to be received in a grasping mechanism for moving the load comprising:
   a first sheet of paperboard having a width and a length and having lip extensions along a widthwise edge and a lengthwise edge,
   a pair of second sheets of paperboard of a width less than the width of said first sheet and greater than the width of said lengthwise lip extension laminated to opposed lengthwise marginal side portions of said first sheet and overlying end portions of said widthwise lip extension, one of said pair of said second sheets having a longitudinal edge portion overlying the length of said lengthwise lip extension,
   a pair of third sheets of paperboard of a width less than the length of said first sheet and greater than the width of said widthwise lip extension laminated to said first sheet and to end portions of each said pair of second sheets and overlying end portions of said lengthwise lip extension, one of said pair of said third sheets having a longitudinal edge portion overlying the length of said widthwise lip extension,
   each said sheets having a machine direction, said slip sheet thus comprising at its corners adjacent said lip extensions a three-layer laminate of said first, second, and third sheets, said lip extensions comprising a two-layer laminate center portion and three-layer laminate end portions, one layer of said three-layer laminate end portion having its machine direction perpendicular to the machine direction of the other two layers thereof.

5. The slip sheet of claim 4 wherein the width of said pairs of said second and third sheets is in the range of 12 to 25% of the width and length of said first sheet, respectively.

6. The slip sheet of claim 4 wherein at least about 5 inch long end portions of said lip extensions are available for receipt in said grasping mechanism.

7. The slip sheet of claim 1 wherein each said sheet has a thickness in the range of about 0.020 to 0.030 inch.

* * * * *

UNITED STATES PATENT AND TRADEMARK OFFICE
CERTIFICATE OF CORRECTION

PATENT NO. : 4,467,004
DATED : August 21, 1984
INVENTOR(S) : Henry L. Liebel

It is certified that error appears in the above-identified patent and that said Letters Patent is hereby corrected as shown below:

Column 8, lines 31-32, claim 7, should read:

--7. The slip sheet of claim 4 wherein each said sheet has a thickness in the range of about 0.020 to 0.030 inch.--

Signed and Sealed this

Nineteenth Day of February 1985

[SEAL]

Attest:

DONALD J. QUIGG

Attesting Officer

Acting Commissioner of Patents and Trademarks